E. JOHNSON.
STEERING ATTACHMENT FOR TRACTION ENGINES.
APPLICATION FILED MAR. 6, 1914.
1,131,523.
Patented Mar. 9, 1915.
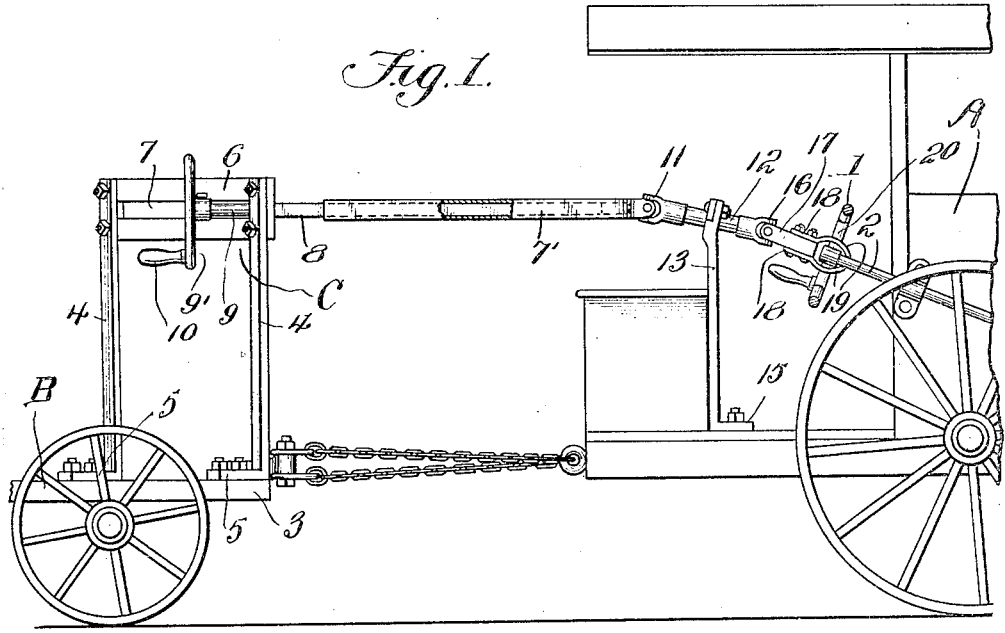
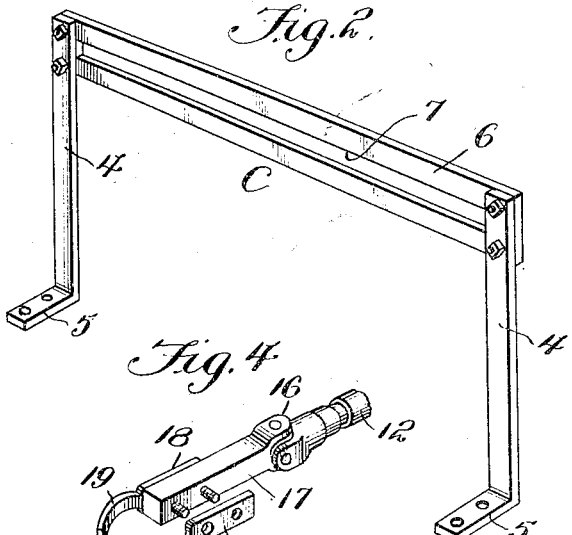
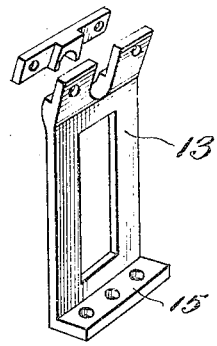
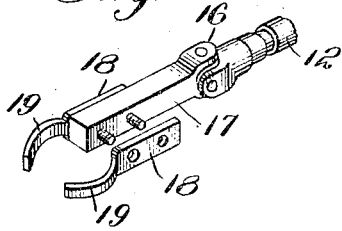
Witnesses
J. T. L. Wright
R. M. Smith
Inventor
Elmer Johnson
By Victor J. Evans
Attorney

UNITED STATES PATENT OFFICE.

ELMER JOHNSON, OF CLAREMONT, SOUTH DAKOTA.

STEERING ATTACHMENT FOR TRACTION-ENGINES.

1,131,523.

Specification of Letters Patent.

Patented Mar. 9, 1915.

Application filed March 6, 1914. Serial No. 822,987.

*To all whom it may concern:*

Be it known that I, ELMER JOHNSON, a citizen of the United States, residing at Claremont, in the county of Brown and State of South Dakota, have invented new and useful Improvements in Steering Attachments for Traction-Engines, of which the following is a specification.

This invention relates to steering attachments for traction engines, the object in view being to provide steering mechanism which may be attached to a traction engine and operated from the platform of a gang plow, thus enabling the services of an engineer on the traction engine to be dispensed with and adapting the traction engine to be steered by a person standing on the platform of a gang plow or other implement or vehicle drawn by the traction engine.

With the above and other objects in view, the invention consists in the novel construction, combination and arrangement of parts, as will hereinafter be more fully described, illustrated and claimed.

In the accompanying drawings:—Figure 1 is a side elevation showing a traction engine and a gang plow drawn thereby and also showing the steering mechanism of this invention. Fig. 2 is a detail view of the supporting rack on the platform of the gang plow. Fig. 3 is a detail view of the detachable steering shaft bearing on the traction engine. Fig. 4 is a detail perspective view of the coupling end of the steering shaft extension of this invention.

Referring to the drawings I have therein illustrated a traction engine conventionally shown at A and a gang plow conventionally shown at B.

1 designates the hand controlled steering wheel of the traction engine mounted on the rear end of the usual steering shaft 2.

3 designates the platform of the gang plow on which the operator usually stands while manipulating the series of plows.

In carrying out the present invention a supporting rack designated generally at C is fastened to the platform 3, said rack comprising the two uprights or posts 4 arranged in spaced relation to each other and provided with attaching feet 5 by means of which they are firmly and rigidly secured to the platform 3. The upper extremities of the posts 4 are connected by a longitudinally slotted and substantially horizontal supporting and guiding rail 6, the slot being indicated at 7 and being designed to receive the steering extension shaft of this invention.

The extension shaft is made up of several sections, the main or longer section which extends between the traction engine and the gang plow comprising two members 7' and 8 slidable telescopically one within the other and each being square in cross section so as to cause them to turn together while permitting the said portion of the shaft to be extended and contracted in length as may be required. The inner section 8 is provided with a round portion 9 where it passes through the slot in the supporting rack and fast on the rear extremity of this part of the device is a hand controlled steering wheel 9' which if desired may be provided with an operating crank handle 10. At its forward end this section of the shaft is connected by a universal joint 11 with the intermediate section 12 of the extension shaft. This intermediate section is journaled in a bearing bracket 13 shown as formed with a foot or base 15 adapting it to be readily secured to the frame or platform of the traction engine. The intermediate section of the shaft is grooved and shouldered so as to prevent the same from moving in the direction of its length and is connected by means of another universal point 16 with the forward section 17 on the extension shaft.

The forward section 17 of the extension shaft has secured to opposite sides of the extremity thereof the base or attaching portions 18 of a pair of reversely bowed fingers 19 which are adapted to be inserted through the spaces 20 between the spokes of the hand controlled wheel 1 on the shaft 2 of the steering mechanism of the traction engine. It is only necessary to move one of the fingers 19 to attach and detach the extension shaft with relation to the hand controlled wheel 1. If it is desired to remove the auxiliary steering mechanism from the traction engine, this may be accomplished by disconnecting the shaft from the control wheel 1 in the manner above stated and also detaching the bearing bracket which supports the intermediate section of the extension shaft. Likewise the rack above described may be detached from the platform of the gang plow.

The auxiliary steering machinism is of simple construction and may be easily and quickly applied to a traction engine and gang plow in the manner illustrated and described.

The mechanism referred to will enable a single operator standing on the platform of the gang plow to steer the traction engine thus dispensing with the services of an extra engineer to control the traction engine.

What I claim is:—

1. Steering apparatus adapted to be connected to the steering mechanism of a traction engine and capable of being operated from the platform of the object drawn by the traction engine, the same comprising a longitudinally extensible steering shaft, a hand controlled wheel on the rear end thereof, means at the forward extremity of said shaft adapted to engage the hand controlled steering wheel of the traction engine, and a supporting rack along which the rear portion of said shaft is slidable laterally.

2. Steering apparatus adapted to be connected to the steering mechanism of a traction engine and capable of being operated from the platform of the object drawn by the traction engine, the same comprising a longitudinally extensible steering shaft, a hand controlled wheel on the rear end thereof, and means at the forward extremity of said shaft adapted to engage the hand controlled steering wheel of the traction engine, said extension shaft comprising a rear extensible section, an intermediate section connected by a universal joint to said rear section, a forward section connected by a universal joint to the intermediate section, and a bearing bracket in which said intermediate section is journaled.

In testimony whereof I affix my signature in presence of two witnesses.

ELMER JOHNSON.

Witnesses:
 Ewd. S. Johnson,
 J. A. Anderson.